United States Patent [19]

Parsons et al.

[11] Patent Number: 4,807,780

[45] Date of Patent: Feb. 28, 1989

[54] VENDING MACHINE FOR BEVERAGE

[75] Inventors: Alfred Parsons, Liverpool; Thomas Sefton, Maghull, both of England

[73] Assignee: Eurocup (Crosby) Limited, Southport, United Kingdom

[21] Appl. No.: 77,685

[22] Filed: Jul. 24, 1987

[30] Foreign Application Priority Data

Jul. 31, 1986 [GB] United Kingdom ................ 8618744

[51] Int. Cl.$^4$ .............................................. B65G 59/00
[52] U.S. Cl. .................................. 221/113; 221/121; 221/133; 221/195; 141/174; 141/173
[58] Field of Search .......................... 221/96, 112–114, 221/123, 133, 195, 194, 209, 258, 298, 297, 289, 221, 222, 121; 222/490, 504, 505, 212, 213, 96, 498, 529; 141/174, 173; 251/129.15, 129.2; 137/487.5

[56] References Cited

U.S. PATENT DOCUMENTS

| 2,565,917 | 8/1951 | Hammerstein | 222/490 |
| 2,726,026 | 12/1955 | Gould et al. | 221/96 X |
| 2,888,167 | 5/1959 | Erickson | 221/113 |
| 3,012,701 | 12/1961 | Weber | 222/504 X |
| 3,794,219 | 2/1974 | Pitel et al. | 221/96 X |

FOREIGN PATENT DOCUMENTS 165359 1/1954 Australia .............................. 221/113

Primary Examiner—Michael S. Huppert
Assistant Examiner—David H. Bollinger
Attorney, Agent, or Firm—Tilton, Fallon, Lungmus & Chestnut

[57] ABSTRACT

A vending machine for dispensing cups comprising a rotatable turret magazine for supporting a plurality of upright columns of cups. A pair of part-circular guide surfaces engage the bottom surface of the lowermost cup in each column, the guide surfaces rising uniformly above a horizontal base plate from a region of minimum cup height to a diametrically opposite position of maximum cup height. A fixed, arcuate cam surface is adapted to engage between the rims of the lowermost and next lowermost cups for stripping the lowermost cup from its column. The guide surfaces and cam cooperate such that, as the magazine is rotated, the lowermost cup from each column is stripped in turn, lowered to a discharge station and then, if that cup is not required, rejoined to its original column. When a desired cup arrives at the discharge station, the rotation of the turret magazine is stopped and that cup is released downwardly to a dispensing station.

4 Claims, 3 Drawing Sheets

VENDING MACHINE FOR BEVERAGE

The present invention relates to vending machines of the type which dispense cupped drinks and in particular to vending machines of this type which utilise a rotatable magazine for dispensing cups containing pre-packed ingredients which basically only require the addition of water, and possibly sugar.

Known vending machines of this type usually comprise a rotatable magazine having a plurality of turrets for holding stacks of pre-packed cups. Because of the contents of the cups, each stack is usually tightly packed so that the cups are sealingly engaged with each other in order to keep the contents fresh. It is thus necessary to pry the bottom cup from the rest of the stack as each cup is required for dispensing. Known means for separating the cups include mechanical hands which separate the bottom cup from the rest of the stack by holding the rest of the stack while prying the bottom cup therefrom. This has required moving mechanical parts which has resulted in a relatively complex and correspondingly costly mechanism.

It is also known to use an arcuate cam which, when the cup magazine has been rotated to bring a required cup into registry with a cup releasing station, is rotated relative to the stationary cup stack at the releasing station to engage between the rims of the bottom and next to bottom cup whereby to strip the bottom cup from the stack so that it drops downwardly to a separate filling station. This latter mechanism has only been used in vending machines of the type where the cups are not pre-packed but are filled with the ingredients after dispensing the cup.

It is a main object of the present invention to provide an improved vending machine for dispensing cups of the pre-packed, ingredient-in-cup type.

In accordance with one aspect of the present invention there is provided a vending machine for dispensing cups, comprising a rotatable turret magazine for supporting a plurality of upright columns of cups, a fixed guide surface which is adapted to engage the bottom surface of the lowermost cup in each column, and a fixed cam surface which is adapted to engage between the rims of the lowermost and next lowermost cups for stripping the lowermost cup from its column, the guide surface and cam co-operating such that, as the magazine is rotated, the lowermost cup from each column is stripped in turn, lowered to a discharge station and then, if that cup is not required, rejoined to its original column; when a desired cup arrives at the discharge station the rotation of the magazine is stopped and that cup is released downwardly to a dispensing station.

Preferably, the magazine is indexed by an electric motor and the release of a desired cup at the discharge station is controlled by an electrically actuated solenoid.

Alternatively, the magazine can be indexed manually and the release of a desired cup at the discharge station can be controlled by a manually displaceable member.

In accordance with a second aspect of the present invention there is provided a mechanism for the release of selected quantities of a particulate material, such as sugar, comprising a rubber beak valve having a normally closed mouth defined at the junction of a pair of converging resiliently flexible walls, and a plunger which is adapted to be selectably displaceable to engage the beak valve adjacent one end of its mouth and to distort the flexible walls such as to cause the mouth to open and allow the particulate material to flow through.

Preferably, the plunger is actuated by an electrically actuable solenoid.

The invention is described further hereinafter, by way of example only, with reference to the accompanying drawings, in which.

Figure 1:
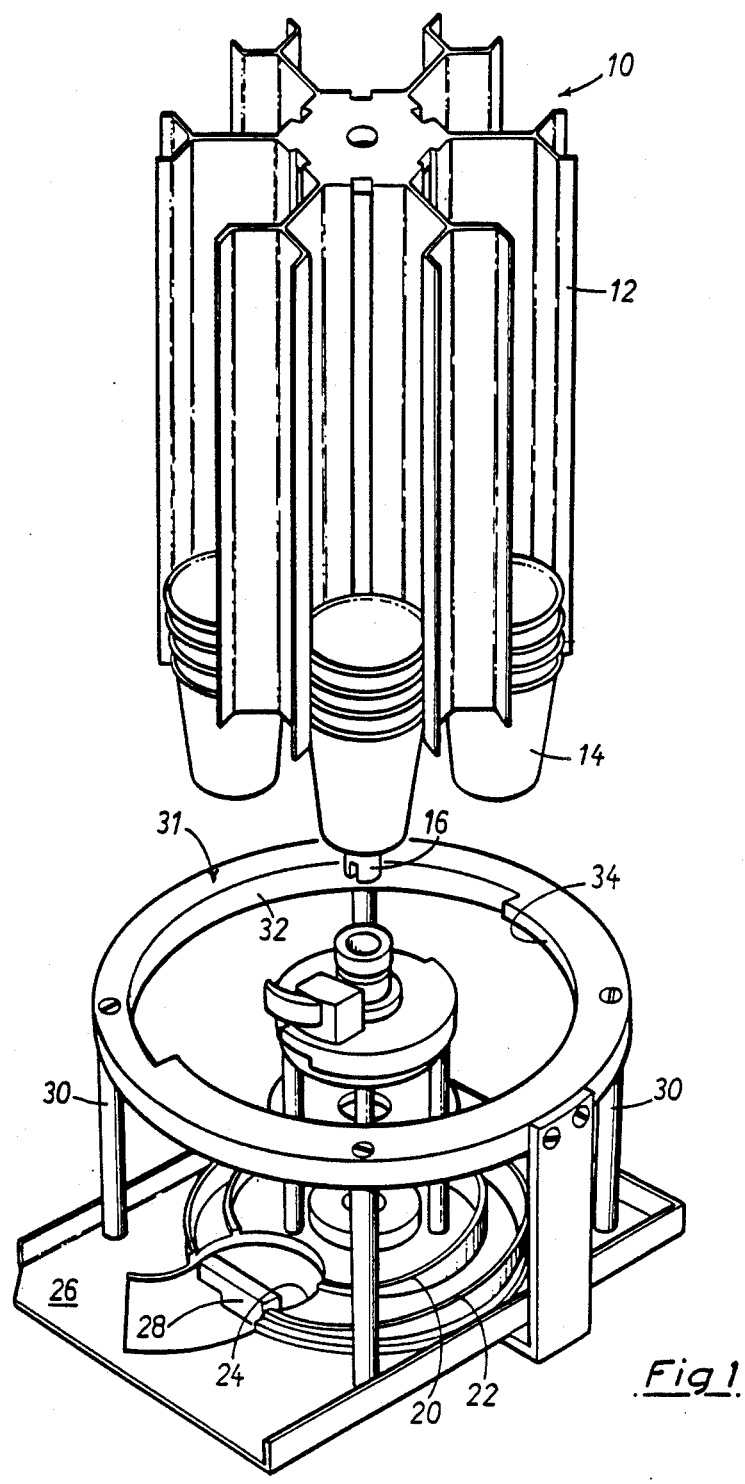
FIG. 1 is a perspective, diagrammatic, partially exploded view of the principal mechanical components of one embodiment of a vending machine in accordance with the present invention.
Figure 2:
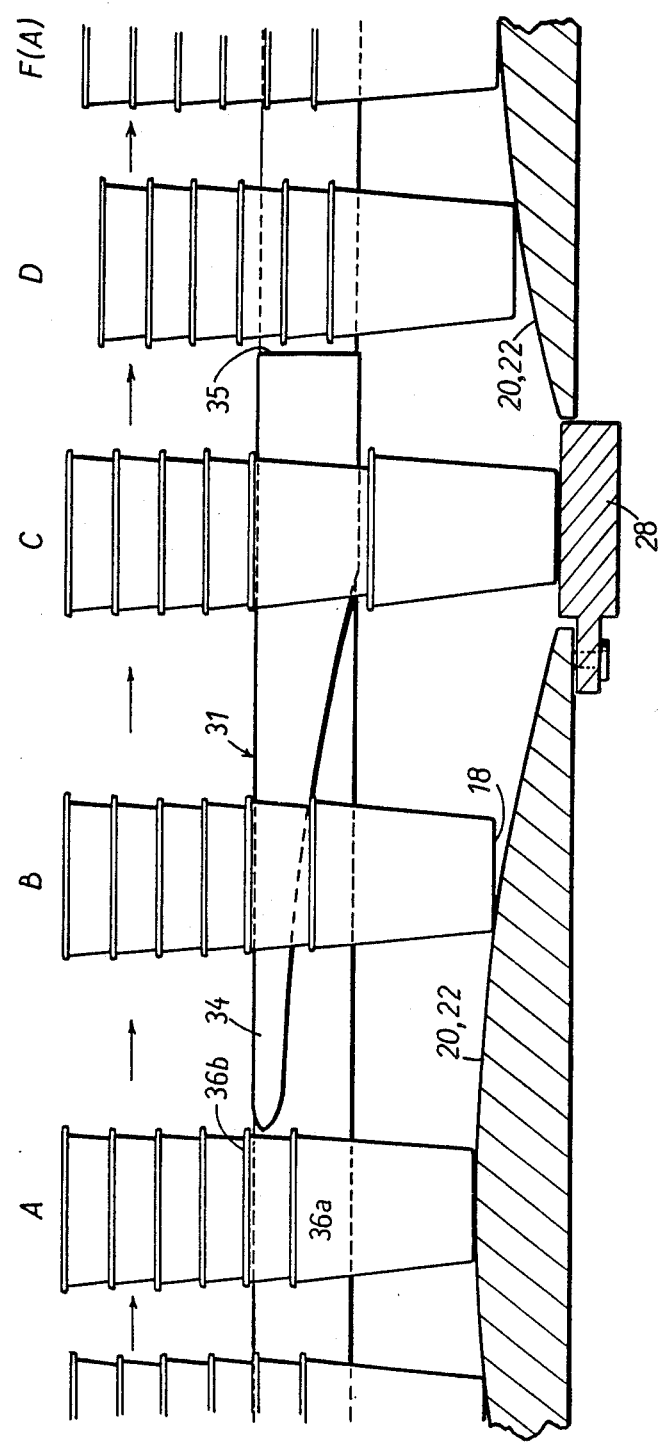
FIG. 2 is a diagrammatic, developed view illustrating the function of the stripping mechanism of the apparatus of FIG. 1.

With reference first to FIGS. 1 and 2, the illustrated apparatus includes a turret mechanism 10 having a magazine 12 adapted to hold a plurality (six in this instance) of columns of plastic cups 14 of the type which are pre-packed with ingredients and require only the addition of water and possibly sugar. The magazine 12 is capable of being selectively indexed about a vertical axis of revolution by means of a stepping motor (not shown) in the lower part of the apparatus which is drivingly coupled to a shaft 16 at the bottom of the magazine 12.

FIG. 1 shows the magazine lifted somewhat above its normal operational position for the purposes of illustration. In its operational position, the cup columns are supported so that the bottom surfaces 18 of the lowermost cups in each column rest on a pair of upstanding guide surfaces 20, 22 which are radially spaced apart on a horizontal base plate 26 so as to engage opposite sides of the cup bottoms and thereby provide stable vertical support for the cups. The guide surfaces 20, 22 are basically circular in plan view and rise generally uniformly from a position of minimum cup height to a generally diametrically opposite position of maximum cup height. At the position of minimum cup height, there is a discontinuity in the guide surfaces to enable a cup to be released through an aperture 24, in the base plate 26 to a dispensing station (not shown). Normally, the aperture is blocked off by a horizontally pivotable bar 28 which is only moved aside when a cup is actually to be released, as described further below.

Fixed disposed above the base plate 26 on a plurality of upright pillars 30 is an annular cup-stripping member 31 whose inner surface 32 carries an arcuate cam 34 which extends over an angle of about 180° around the surface 32. As best seen in FIG. 2, the cam 34 is dimensioned and shaped so as to engage between the rims 36a, 36b of the bottom and next to bottom cups as they are carried past the highest point on the guide surfaces 20, 22 (position A in FIG. 2) by the rotating turret mechanism (from left to right in FIG. 2). As the cups continue to rotate with the turret, the bottom-most cup is gradually stripped off its associated column by the cam 34, this cup at the same time being gradually lowered by the guide surfaces 20, 22 (position B in FIG. 2). Eventually the stripped cup reaches the position of minimum height where it is supported only by the bar 28 (position C in FIG. 2). If this cup is required to be dispensed, the rotation of the turret is arranged to stop and the bar 28 to be moved aside so that the stripped cup can then drop through the aperture 24 to the dispensing station below. However, if this cup is not required, then it rides over the bar 28 and is engaged by the rising surface of the guides 20, 22 (see position D in FIG. 2). Eventually the cup reaches the right-hand position F in FIG. 2 which corresponds once again to position A.

It will be noted from FIG. 2 that, intermediate positions C and D, the trailing end 35 of the cam 34 is reached at which point the other cups in the column, with which the stripped cup was initially associated, drop back onto the stripped cup to reform the column. The whole column is thus lifted by the surfaces 20, 22 from the position D to the position A whereby the original condition is obtained again.

It will also be noted that while the firstmentioned stripped cup was being passed through this operation, the other lowermost cups in each other column were being passed through an identical operation but out of phase with the first-mentioned cup by 60° intervals, respectively. Thus, all of the lowermost cups undergo a complete cycle of operation every rotation of the turret, i.e. they are stripped from the next cup, moved over the bar 28 and are rejoined with the relevant column.

Associated with the apparatus is an electronic control device which is arranged to respond to an input signal requesting the dispensing of a cup from a selected one of the columns (corresponding to a selected beverage such as tea, coffee or the like) and to index the turret until a cup from the selected column is present over the bar 28 at position C. The bar 28 is then temporarily moved aside, for example by a solenoid, so as to enable that cup to drop to the dispensing station.

It will be appreciated that this is a very simple mechanism involving (apart from the bar 28) only one essentially moving part, namely the turret itself. Stripping takes place over an angle of about 180° so that a high mechanical advantage is provided for the stripping action.

Apart from being a means for releasing a selected cup, the electrically released bar 28 acts as an effective anti-theft device to prevent cups from being manually removed from the machine without an appropriate coin having been inserted.

Normally, the turret would be driven by an electric stepping motor and the system would be controlled by an electronic control system. However, in a simplified embodiment, the turret can be indexed manually, for example by means of a suitable handle and gear train, and the bar 28 can be displaced manually to drop the selected cup.

Figure 3:
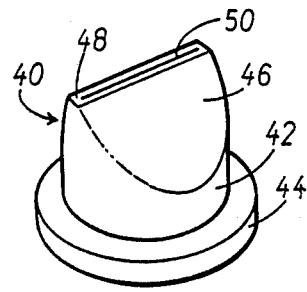
FIG. 3 is a perspective view of a rubber beak valve.
Figure 4:
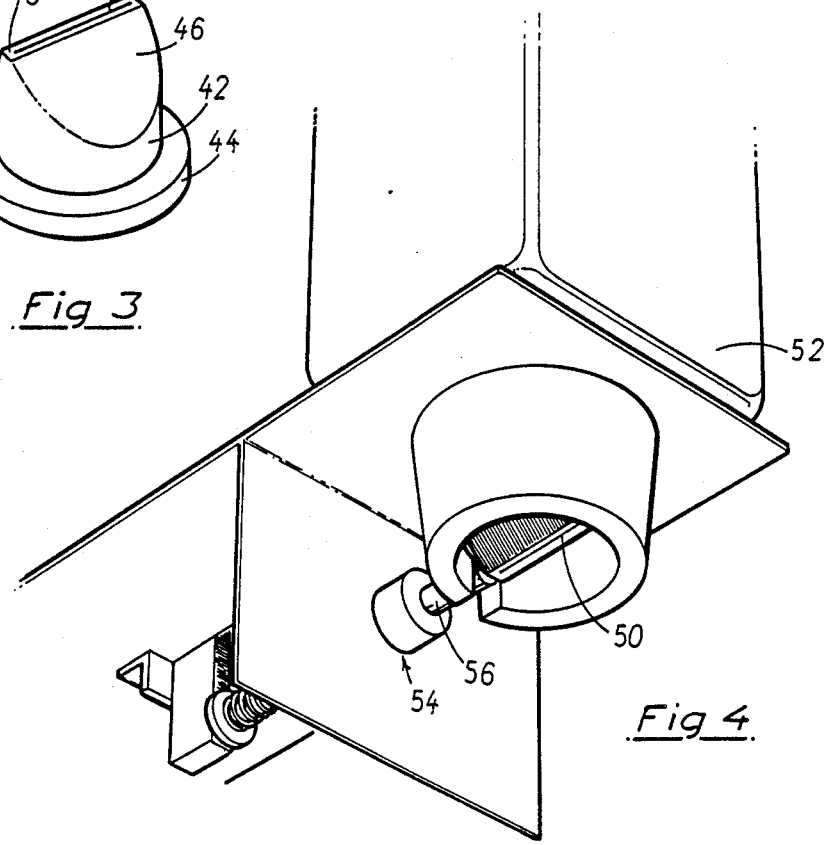
FIG. 4 is a perspective view of a sugar dispensing mechanism employing the beak valve of FIG. 3.
Figure 5:
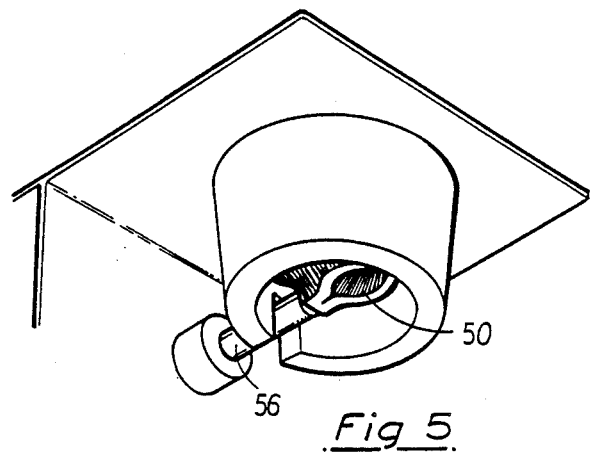
FIG. 5 is a perspective view of the mechanism of FIG. 4 when in its actuated condition.

FIGS. 3 to 5 show a preferred means of dispensing sugar to a cup dispensed by the above-described apparatus. FIG. 3 shows a device 40 known as a beak valve which is used as a one-way valve in many liquid flow systems. The device 40 is made of flexible rubber and has a tubular body 42 having at its one end a peripheral annular flange 44. The other end of the body 42 is defined by a pair of opposed converging walls 46 (only one of which is seen in FIG. 3) which meet at an end surface 48 containing a slotted mouth 50. In the relaxed state of the device, the mouth 50 is closed. When the device is inserted in a liquid flow line, liquid can flow through the mouth from the tubular body side by deformation of the walls 46 to open the mouth. However, liquid cannot flow back into the mouth in the other direction. The device in its conventional usage thus acts as a one-way valve for liquid flow lines.

In the present arrangement, a flexible rubber valve of the above-described type is mounted at the lower end of a housing 52 containing sugar granules, such that the slotted mouth 50 faces downwardly. Mounted adjacent to the valve is a solenoid operated plunger 54 having an output rod 56 which can be displaced by the solenoid from a first position (FIG. 4) where the valve is unstressed by the rod to a second position (FIG. 5) where the rod engages the valve adjacent one end of the mouth and distorts the flexible walls 46 so as to cause the mouth to open and allow sugar to flow through. The solenoid is arranged to be opened for a specific period to allow through a predetermined quantity of sugar. Different periods may be selectable to vary the quantity of sugar dispensed.

Since the valve closure member is itself subject to flexible distortion each time the valve is operated, this in itself tends to keep the valve free from the solid deposits which are usually associated with sugar dispensers and which cause such dispensers to be unreliable unless cleaned very frequently. The present device has been found to operate reliably over long periods without attention.

We claim:

1. A vending machine for dispensing cups, comprising:
   a rotatable turret magazine for supporting a plurality of upright columns of cups;
   a base plate;
   means for defining an aperture in said base plate;
   a fixed guide surface which engages the bottom of the lowermost cup in each column, said fixed guide surface being of generally circular configuration in plan view and rising generally uniformly above said base plate from a region of minimum cup height to a generally diametrically opposite position of maximum cup height;
   a fixed cam surface which engages between the rims of the lowermost and next lowermost cups for stripping the lowermost cup from its column, the guide surface and cam cooperating such that, as the magazine is rotated, the lowermost cup from each column is stripped in turn, lowered to a discharge station and then, if that cup is not required, rejoined to its original column;
   means responsive to a desired cup arriving at said discharge station to stop the rotation of the magazine and to release that cup downwardly to a dispensing station;
   means defining a discontinuity in said generally circular fixed guide surface located at the region of minimum cup height to enable a selected cup to be released through said aperture in the base plate to said dispensing station;
   a displaceable stop which normally occupies a position adjacent said aperture in the base plate for guiding cups across said discontinuity in the fixed guide surface but which can be selectively displaced so as to enable a selected cup to pass through the aperture to said discharge station; and
   an electrically actuable solenoid for moving said displaceable stop between its two operational positions.

2. A vending machine according to claim 1, wherein said fixed guide surface comprises a pair of concentric guide members which are radially spaced apart on said base plate.

3. A vending machine according to claim 1, wherein said fixed cam surface extends over an arc of approximately 180 degrees.

4. A vending machine according to claim 3, wherein said fixed cam surface is carried by an annular support member which is itself supported above said base plate.

* * * * *